United States Patent

[11] 3,593,495

[72] Inventor John M. Ellison
 Sherman Oakes, Calif.
[21] Appl. No. 834,653
[22] Filed June 19, 1969
[45] Patented July 20, 1971
[73] Assignee Vacuum Atmospheres Corporation
 North Hollywood, Calif.

[54] A METHOD FOR GAS PURIFICATION FROM A SYSTEM RETORT
 4 Claims, 4 Drawing Figs.
[52] U.S. Cl. .................................................. 55/68, 55/269
[51] Int. Cl. .................................................. B01d 39/00
[50] Field of Search .................................. 55/33, 66, 68, 208, 269, 387; 23/2

[56] References Cited
UNITED STATES PATENTS
2,915,883  12/1959  Van Der Ster ............... 55/269
3,085,379  4/1963  Kiyonaja et al. ............. 55/58
3,467,493  9/1969  Eguchi et al. ................ 55/66
FOREIGN PATENTS
961,925  6/1964  Great Britain ................ 55/66

Primary Examiner—Reuben Friedman
Assistant Examiner—Charles N. Hart
Attorney—White & Haefliger ABSTRACT: The disclosure concerns the operation of a gas purification retort unit wherein removal of a gas flow tube and getter carrier from a heated container are facilitated, and the mode of operation of the tube and baffle structure carried thereby are such that heat transfer from hot gas to a sealed interconnection between the container and a removable head is blocked. Operation of the retort unit in a system for treating gas containing oxygen, hydrogen and water is also disclosed.

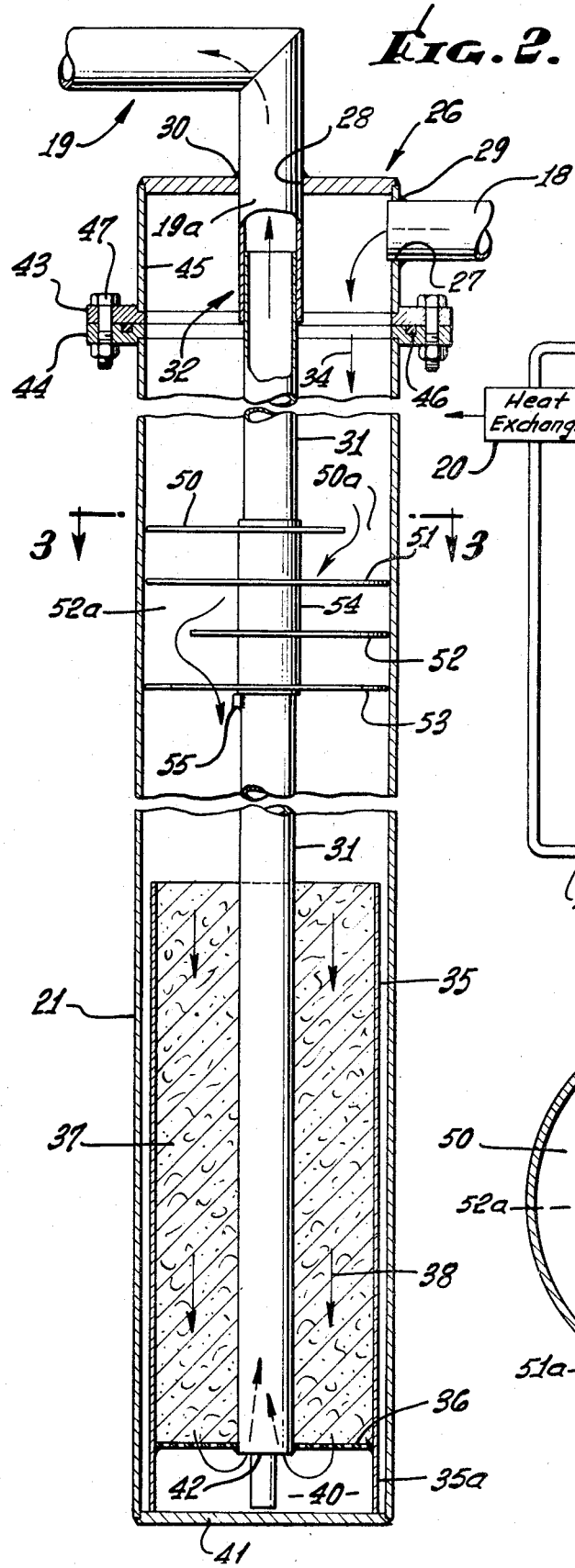
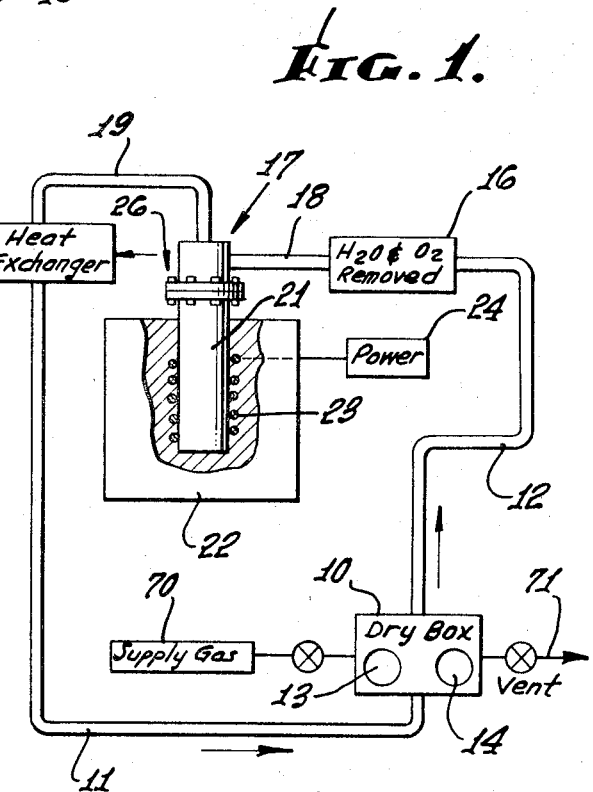
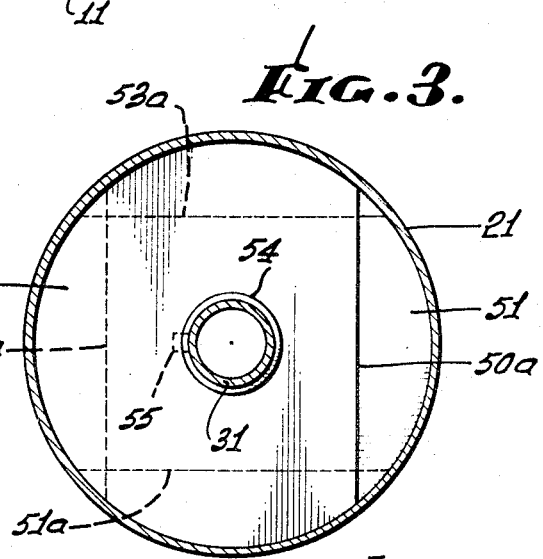
INVENTOR.
JOHN M. ELLISON
BY White & Haefliger
ATTORNEYS.

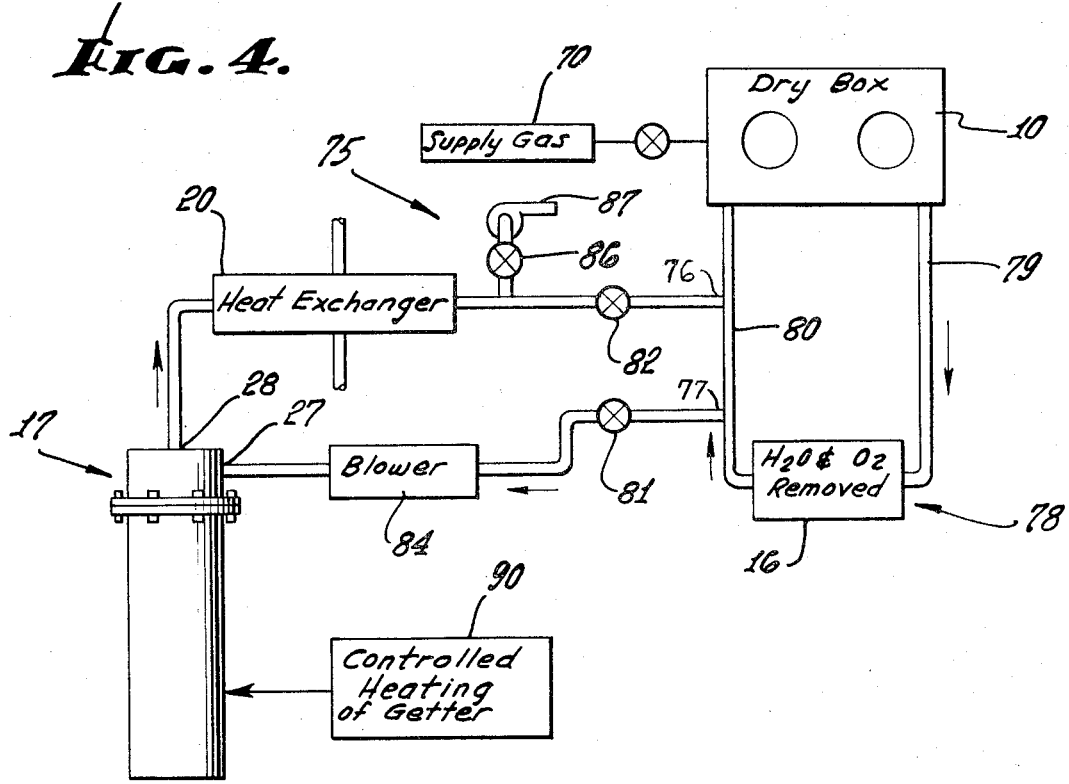

A METHOD FOR GAS PURIFICATION FROM A SYSTEM RETORT

BACKGROUND OF THE INVENTION

This invention relates generally to gas purification and more particularly a method for removing trace contaminants from gas streams, as for example inert gas or gases.

Modern research and production demands inert atmosphere systems of uncompromising quality, reliability and efficiency. For example, researchers working with space age materials have recognized the substantial and undesirable influence that trace contaminating elements may have upon materials requiring extremely pure atmosphere environments, and consequently lower impurity levels are constantly demanded. Thus, controlled atmospheres of high purity are needed for application such as solubility studies and measurements, physical chemistry, radioactive materials handling and welding of so-called "exotic" metals biological growth, long term storage.

One way in which trace contaminants such as nitrogen may be removed or scrubbed from an inert gas (such as argon) stream is to pass the stream through a porous getter at elevated temperature, and in such manner that the nitrogen or other trace contaminant becomes absorbed or reacted by the getter. While this mode of contaminant removal is highly desirable, apparatus and method to effect same has been found to result in certain disadvantages. Among these are the difficulties of containing and supporting the getter for removal from the gas stream and replacement at periodic intervals; and the problem of sealing the getter in a contained and gas passing retort zone subjected to extremely high temperature, the latter tending to destroy the sealing medium.

SUMMARY OF THE INVENTION

It is a major object of the invention to provide a solution to the above-mentioned problems and difficulties. Basically, the invention in its apparatus aspects is embodied in a gas purification retort unit that comprises a container having a removable head with gas stream inlet and outlet openings, the container adapted to be heated as by an electric furnace; a tube removably received within the container to pass the gas stream and having communication with one of the openings, carrier means on the tube within the container to support a getter for a component of the gas stream, and in such manner that the tube and carrier means are removable from the container as facilitated by removal of the head; and the tube having a port communicating with the other opening in the head and via the container interior outside the tube. Typically, a duct section carried by the head to communicate with said one opening has telescopic interconnection with the head to facilitate the removal of the head and tube. Also, the head and container may have sealed interconnection, and means is provided in the path of gas flow toward the getter outside the tube and operable to pass the inlet gas flow in intimate cooling relation with the container between the carrier and interconnection. As will be seen, such means may advantageously comprise baffle structure extending between the tube and container and carried by the tube so as to be movable with it and to intercept and reflect back toward the getter heat radiated toward the baffle and sealed interconnection. Accordingly, the sealed interconnection may be kept relatively cool despite the high temperature at the getter receiving zone.

Additional objects and advantages of the novel apparatus aspects of the invention include the provision of a getter carrier means in the form of a receptacle having a perforated base toward which and through which the gas stream flows after passing through the getter, there being a plenum chamber formed at the lower side of the base opposite the getter; and the tube port being open to the plenum chamber to receive gas therefrom for reverse flow within the tube to the outlet. Thus, the gas flow functioning and cooling of the sealed interconnection are efficiently effected as a result of assembling the removable tube and getter carrier into the container in a simple manner, replacement of the getter being made possible by removing the head and tube. Typically, the getter may consist of titanium sponge for removing trace nitrogen from an inert gas stream, and the retort apparatus may be connected into a gas stream recirculating system via the ducts in the removable head, with unusual advantages.

In its method aspects, the invention concerns flowing reverse hot flow of gas to and through a removable head after flow through a getter, confining such reverse flow to pass in spaced relation to the interconnection between the head and container so that cool inlet gas flows in that space; and directing the cool inlet gas to flow in a spiral between the container inner wall and the hot reverse flow. Further, the method may include intercepting the heat radiation from the hot getter toward the interconnection.

These and other objects and advantages of the invention, as well as the details of an illustrative embodiment, will be more fully understood from the following detailed description of the drawings, in which:

BRIEF DESCRIPTION OF DRAWINGS

FIG. 1 is a schematic showing of a system incorporating the invention;

FIG. 2 is an elevation taken in section to show a retort incorporating the invention;

FIG. 3 is a section taken on line 3-3 of FIG. 2; and

FIG. 4 illustrates a modified system.

DETAILED DESCRIPTION

Referring first to FIG. 1, a so-called dry box is shown at 10 as representative of a chamber or environment through which extremely pure gas is circulated via entrance and exit ducts 11 and 12. Such a chamber may for example comprise a "glove box" having gloves forming barriers at locations 13 and 14 and which enable manual manipulation of tools and work in the interior of the chamber, while the atmosphere of the interior is closely controlled as respects its purity. Thus, welding or other operations may be carried out in box 10. Due to such work and also due to other causes such as diffusion of air and moisture into the chamber through the gloves, moisture, oxygen and nitrogen enter the controlled atmosphere and it becomes necessary to remove these contaminants during recirculation of the gas from duct 12 to duct 11. More generally, chamber or box 10 may be looked upon as any source of gaseous contamination of a recirculating gas stream. Recirculated inert gas may for example consist of argon, and a makeup supply is seen at 70, and a vent at 71 (for box pressure control only). Although unit 17 will remove oxygen, water vapor, hydrogen and other contaminants, the most efficient method of operation to minimize the replacement of the getter material in unit 17 is as described below.

Gaseous contaminant removal is represented as effected in FIG. 1 at multiple stations, moisture and oxygen being removed by the dry-train unit 16, and nitrogen being removed by the subsequent scrubber unit 17. Unit 16 is connected with box 10 via duct 12, and with unit 17 via duct 18. The scrubbed gas effluent from unit 17 is returned to box 10 via duct 19, heat exchanger 20 and line 11, the exchanger functioning to cool the purified gas to a temperature level desired at the box 10.

Removal of trace nitrogen from the gas in unit 17 occurs by virtue of a getter action at elevated temperature, the getter being located within the retort cylindrical container 21 which is received into a furnace 22. The latter may for example have electrical resistance elements 23 through which current is passed from a power supply 24 to create heat which is transferred to the interior of the retort and to the getter. Merely as illustrative, the getter temperature may become elevated to a level in excess of 1,500° F. As mentioned in the introduction, such heating creates problems of destruction or deterioration of sealing of the container, which in turn introduces the problem of contamination of the gas stream via leakage of air into the container at the seal. This is a substantial problem in view of the extreme purity requirements imposed on the gas supplied to the dry box.

In accordance with the invention, the retort unit 17 comprises, in addition to the container 21, a removable head 26 having gas stream inlet and outlet openings, as for example in the side and top of the head at 27 and 28. Duct 18 projects into opening 27 and may be welded to the head at 29, and duct section 19a projects into opening 28 and is welded to the head at 30. Further, an elongated tube, as for example tube 31, is removably received in the container to extend centrally therein to pass the gas stream, the tube having communication with one of the openings, as for example opening 28 via duct section 19a. In this regard, duct section 19a may desirably have close telescopic interconnection with the tube at 32 to facilitate separation of the head from the container and tube when the head is removed, so that the tube may then be removed separately from the container for replacement of the getter to be described.

Carrier means is provided on the tube within the container to hold a getter for a component of the gas streams, all in such manner that the tube and carrier are removable from the container as facilitated by removal of the head from the container. In the illustrated example, the carrier comprises an upright cylindrical receptacle or basket 35 of thin-walled (metallic) construction, and having a perforate transverse base 36 attaching the receptacle to the lower portion of the tube. A portion of the getter material is shown at 37 as supported within the receptacle and on the base 36 to have intimate contact with the gas stream 38 flowing downwardly as indicated. One illustrative getter consists of titanium sponge which at elevated temperature serves to chemically react with nitrogen forming titanium nitride.

After the gas has passed downwardly through the getter and perforate base panel 36, it enters a hollow plenum chamber 40 formed below the base above the bottom wall 41 of the container 21, and inwardly of the lowermost extent 35a of the receptacle. The lower rim of the extent 35a seats on the bottom wall 41 to block bypassing of gas around the getter to the plenum. From the latter, the hot gas passes upwardly into the tube 31 via entrance port 42, for reverse flow to the container outlet.

FIG. 2 shows the head and container having sealed interconnection at a point well above the intensely heated lower region of the container. Such interconnection may for example be supplied by flanges 43 and 44 integral with the head skirt 45 and container top, an annular metallic or nonmetallic seal 46 being retained between such flanges. Removable fasteners 47 interconnect the flanges.

In order to prevent destructive (hot) deterioration of the seal, means is provided in the path of cool gas flow 34 toward the getter to effect passage of such flow in cooling relation with the container between the carrier and the interconnection. Such means may typically comprise baffle structure extending between the tube and container and carried by the tube, the baffle structure also being operable to intercept and reflect back toward the getter heat radiated upwardly toward the baffle. Accordingly, both upwardly radiated heat and upwardly conducted heat are blocked from reaching the seal 46 to such an extent that deterioration of the latter leading to gas leakage are prevented. In the illustrated example, the baffle structure includes transverse baffles 50—53 which are carried on a sleeve 54 received on tube 31 and stopped at 55. A gas swirling effect is created to cause the gas to spiral flow about the tube with efficient heat removing contact against the hot tube and the inner wall of the container. FIG. 3 shows the openings 50a—53a formed between the respective baffles and container, at 90° intervals about the tube axis, to create the swirl flow. Cool gas also flows at 34 between the hot tube and the interconnection.

Such baffles also intercept heat radiated upwardly toward them from the hot getter zone, and may be polished to reflect such heat back downwardly. Staggering of the openings 53a and 52a so as to be out of alignment assures that baffle extent exposed to such radiation extends completely across the interior of the container outside the tube. Finally, note that the seal and flanges are outside the furnace, in FIG. 1.

In summary, the method of cooling the sealed interconnection between the container and head, (the container being heated to elevated temperature at a getter location spaced from the interconnection) may include the following steps:

a. flowing relatively cool inlet gas from the head to and through the getter and reversely back to and through the head to the exterior, the gas becoming heated by the retort wall and baffles and by contact with the getter;

b. confining the hot gas to flow reversely in spaced relation to the interconnection and so that the cool inlet gas flows between the interconnection and the hot reverse gas flow, and c. directing the inlet gas to flow in a spiral between the container and the hot reverse flow. A further step comprises intercepting heat radiated from the getter toward the interconnection via the inlet gas.

FIG. 4 illustrates a modified system wherein the elements which are the same as in FIGS. 1 and 2 bear the same identifying numerals. In this instance, the openings or connections 27 and 28 of the retort unit 17 are connected in a side loop 75 communicating at 76 and 77 with the closed loop system 78. The latter includes the dry box 10, $O_2$ and $H_2O$ removal unit 16, and communicating ducts 79 and 80. When valves 81 and 82 in the side loop are open, the flow from unit 16 tends to pass through the retort prior to recirculation to the dry box, a blower 84 assisting such flow. At times when the gettering agent in retort 17 is to be changed, valves 81 and 82 are closed. Accordingly, the getter change may be carried out without altering the flow or purification condition for the main loop system 78. After the change, a valve 86 may be opened and the side loop 75 pumped at 87, to establish a purifying vacuum in the side loop. Thereafter, valve 86 may be closed and valves 81 and 82 reopened to reconnect the side loop in series with the leg 80. Loss of gas may be made up by supply 70. In the event circulation in loop 78 becomes restricted, circulation will continue in the side loop 75 and via the leg 80.

The system of FIG. 4 may also be used to remove hydrogen from a gas stream passing through unit 17 as follows: a titanium gettering agent in unit 17 is controllably heated (electrically for example) at 90 to an optimum gettering temperature, which may typically be approximately 600° F. Gas is then circulated through unit 17, as described, to accomplish the hydrogen removal. Thereafter, valves 81 and 82 are closed following which the temperature of the getter is raised to a level well in excess of 600° F. and at which absorbed hydrogen is given off. Valve 86 is opened and pump 87 operated to evacuate the retort 17, liberated hydrogen thereby being removed and the getter purged. Thereafter, valve 86 may be closed and valves 81 and 82 opened to reestablish flow of hydrogen containing gas through the getter, the temperature of which is now lowered to hydrogen absorbing level.

I claim:

1. The method of cooling the sealed interconnection between a container and a head, and removing impurities from a gas stream, the container having a gettering agent therein and a tube including means for supporting the gettering agent on the tube, the tube extending above the gettering agent into the head, the container being heated to elevated temperature at the gettering agent location spaced from said interconnection that includes:

a. flowing relatively cool inlet gas containing the impurities from the head to and through the sealed interconnection and through the gettering agent, the gas being heated by contact with the gettering agent and heating structure associated with the container while the impurities are removed from the gas;

b. confining the hot gas to flow reversely within the tube and above the gettering agent in spaced relation to the sealed interconnection so that the cool inlet gas flows between the sealed interconnection and the hot reverse gas flow within the tube thereby cooling the hot gas within the tube so that the sealed interconnection remains cool; and c. directing the cool inlet gas to flow in a spiral between the container inner wall and said reverse flow within the tube.

2. The method of claim 1 including the step of intercepting heat radiated from the getter toward said interconnection via the inlet gas.

3. The method of claim 1 including flowing said gas containing impurities including hydrogen to said getter of the type and at a reduced temperature characterized in that hydrogen is removed by the getter from the gas flow, and thereafter discontinuing said gas flow to the getter and also subjecting the getter to elevated temperature and vacuum purging to remove hydrogen from the getter.

4. The method of claim 1 including periodically removing said head, withdrawing the tube from the container, replacing the gettering agent on the tube, and reinserting the tube into the container.